United States Patent [19]

Miller

[11] Patent Number: 5,595,798

[45] Date of Patent: *Jan. 21, 1997

[54] PROTECTIVE HOLDERS FOR DISKS

[75] Inventor: William R. Miller, Walnut, Calif.

[73] Assignee: Rembrandt Photo Services, City of Commerce, Calif.

[*] Notice: The term of this patent shall not extend beyond the expiration date of Pat. No. 5,595,797.

[21] Appl. No.: 326,540

[22] Filed: Oct. 20, 1994

Related U.S. Application Data

[63] Continuation-in-part of Ser. No. 145,253, Oct. 29, 1993, and Ser. No. 14,817, Oct. 29, 1993, Pat. No. Des. 353,837.

[51] Int. Cl.$^6$ ................................................. B65D 85/57
[52] U.S. Cl. ........................... 428/35.2; 428/45; 428/76; 428/192; 428/200; 428/694 R; 428/900; 206/308.1; 206/311; 206/312; 206/456; 206/472; 206/473; 206/474; 206/484.2; 281/38; 402/79; 360/133; 369/291; D3/227; D3/253; D19/32; D19/33
[58] Field of Search ................................ 428/34.1, 35.2, 428/192, 45, 200, 76, 349, 345, 694 R, 900; 206/472, 473, 474, 484.2, 456, 444, 311, 312, 308.1, 387.1; 40/159, 537, 124.2, 323; 402/79; 281/38; D19/32, 33; D3/227, 253; 369/291; 360/133

[56] References Cited

U.S. PATENT DOCUMENTS

| | | | |
|---|---|---|---|
| D. 240,816 | 8/1976 | Peterson | D19/33 |
| D. 242,960 | 1/1977 | Stanley | D99/34 |
| D. 261,155 | 10/1981 | Nast | D19/33 |
| D. 262,040 | 11/1981 | Wihlke | D19/33 |
| D. 304,781 | 11/1989 | Hanson | D6/629 |
| D. 316,107 | 4/1991 | Lockner | D19/20 |
| D. 316,180 | 4/1991 | Hines | D6/629 |
| D. 318,068 | 7/1991 | Truc et al. | D19/33 |
| D. 325,817 | 5/1992 | Call | D6/626 |
| D. 345,765 | 4/1994 | Fritz | D20/42 |
| D. 353,837 | 12/1994 | Miller | D19/33 |
| 429,752 | 6/1890 | Camp | 229/92.9 |
| 821,019 | 5/1906 | Cooke, Jr. | 229/72 |
| 1,029,836 | 6/1912 | Warne | 229/92.9 |
| 1,168,634 | 1/1916 | Hoffman | 40/371 |
| 1,186,312 | 6/1916 | Hanselmann | 206/311 |
| 1,315,696 | 9/1919 | Alstrand | 229/72 |

(List continued on next page.)

FOREIGN PATENT DOCUMENTS

| | | |
|---|---|---|
| 0022973 | 6/1948 | Finland . |
| 0642651 | 9/1928 | France . |
| 1194784 | 11/1959 | France . |
| 0125897 | 5/1919 | United Kingdom . |

OTHER PUBLICATIONS

Specimen of double page for "CD Wallet" product Model No. PCD 32; Alpha Enterprises, Inc. (First Version), 1993.
Specimen of double page for "CD Wallet" product Model No. PCD32; Alpha Enterprises, Inc. (Second Version), 1993.
Specimen of double page for "CDP reserver" product; Pride Plastics.
Specimen of "ProSleeve" CD sleeve; Case Logic, Inc.
Specimen of "Ultra Pro" sports card album page, manufactured by Rembrandt Photo Services, California 1990.
Cover page and pp. 32–33 of 20th Century Plastics Catalog, Jan. 1991, California.

*Primary Examiner*—Ellis Robinson
*Assistant Examiner*—Rena L. Dye
*Attorney, Agent, or Firm*—David Weiss

[57] ABSTRACT

A device for protectively holding a disk, and in particular a plastic wallet for protectively containing an optical digitally encoded disk such as a compact disc or CD. The wallet is fabricated of flexible thermoplastic sheet material and includes a pocket for containing the CD, as well as pockets arranged for containing a single graphics sheet viewable through the transparent front and rear covers of the wallet. A preferred embodiment of the CD wallet includes an opening through one of the sheets of the CD pocket for assisting in withdrawing the CD from its pocket.

23 Claims, 3 Drawing Sheets

U.S. PATENT DOCUMENTS

| | | | |
|---|---|---|---|
| 1,459,457 | 6/1923 | Wilburger | 206/311 |
| 1,563,034 | 11/1925 | Levine | 150/112 |
| 2,463,450 | 3/1949 | Wisner | 206/311 |
| 2,500,773 | 3/1950 | Robins | 312/9.9 |
| 2,881,912 | 4/1959 | Kursh | 206/312 |
| 3,422,952 | 1/1969 | George | 206/312 |
| 3,443,686 | 5/1969 | Raymond | 206/472 |
| 3,446,260 | 5/1969 | Osher | 206/205 |
| 3,473,653 | 10/1969 | Nunes | 206/205 |
| 3,688,898 | 9/1972 | Stanton | 206/311 |
| 3,722,564 | 3/1973 | Croon | 206/311 |
| 3,864,755 | 2/1975 | Hargis | 360/133 |
| 4,043,477 | 8/1977 | Deese | 220/23.4 |
| 4,076,874 | 2/1978 | Giovanelli et al. | 428/35.2 |
| 4,263,357 | 4/1981 | Holson | 428/138 |
| 4,327,831 | 5/1982 | Inaba et al. | 206/310 |
| 4,339,034 | 7/1982 | Panveno | 206/313 |
| 4,365,708 | 12/1982 | Tyus | 206/309 |
| 4,413,298 | 11/1983 | Pecsok et al. | 360/133 |
| 4,447,973 | 5/1984 | Wihlke | 40/159 |
| 4,473,153 | 9/1984 | Colangelo | 206/312 |
| 4,508,366 | 4/1985 | Brindle | 281/36 |
| 4,538,730 | 9/1985 | Wu | 206/45.13 |
| 4,549,658 | 10/1985 | Sfikas | 206/466 |
| 4,566,590 | 1/1986 | Manning et al. | 206/232 |
| 4,610,352 | 9/1986 | Howey et al. | 206/313 |
| 4,620,630 | 11/1986 | Moss | 206/45.24 |
| 4,623,062 | 11/1986 | Chase et al. | 206/311 |
| 4,676,374 | 6/1987 | Wilkins | 206/308.4 |
| 4,699,268 | 10/1987 | Oishi | 206/313 |
| 4,704,042 | 11/1987 | Eisen et al. | 402/79 |
| 4,709,812 | 12/1987 | Kosterka | 206/310 |
| 4,778,047 | 10/1988 | Lay | 206/749 |
| 4,793,477 | 12/1988 | Manning et al. | 206/232 |
| 4,850,731 | 7/1989 | Youngs | 402/79 |
| 4,971,195 | 11/1990 | Mitsuyama | 206/308.1 |
| 5,085,318 | 2/1992 | Liverick | 206/308.1 |
| 5,087,145 | 2/1992 | Cooley | 402/79 |
| 5,154,284 | 10/1992 | Starkey | 206/308.1 |
| 5,207,717 | 5/1993 | Manning | 206/232 |

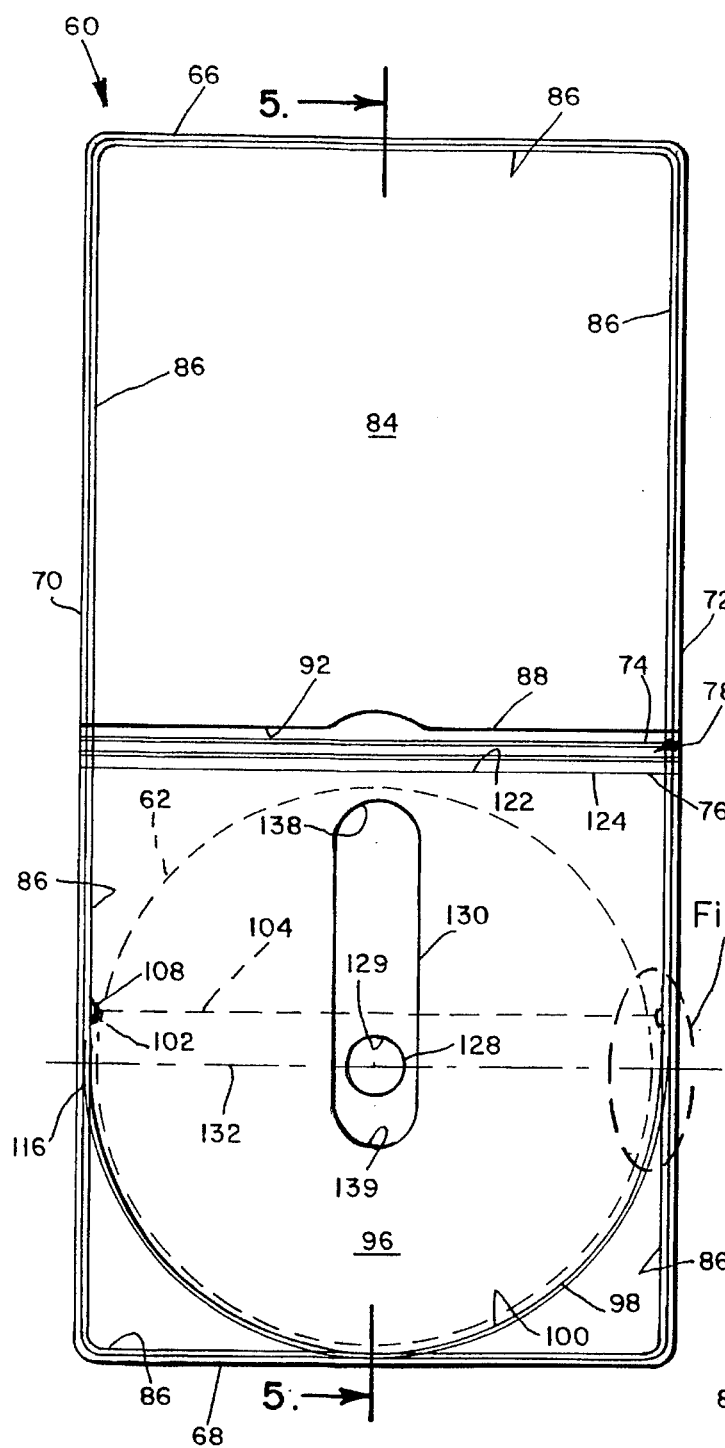
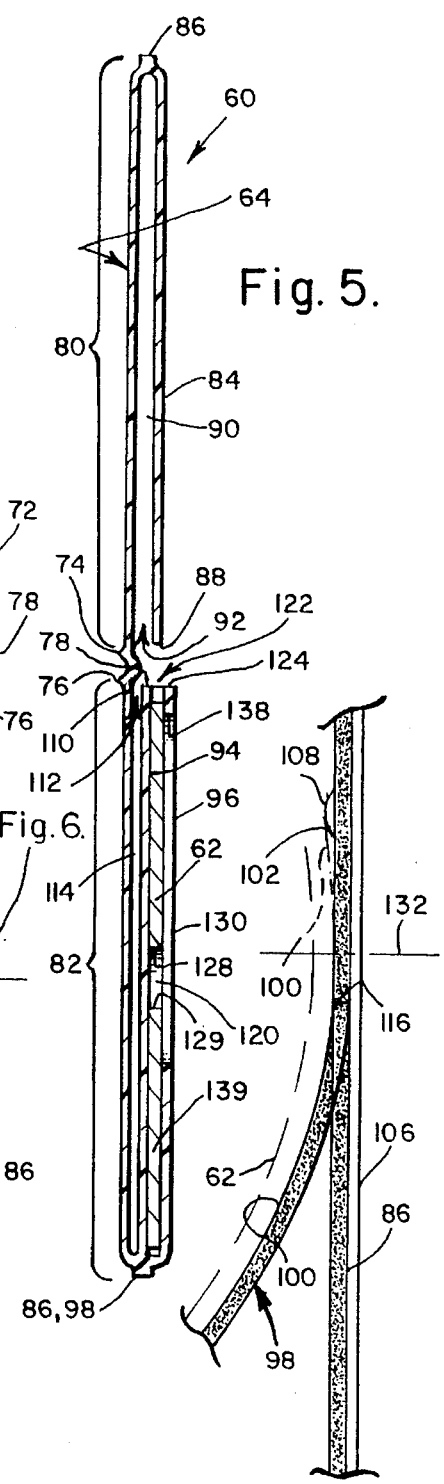
Fig. 4.
Fig. 5.
Fig. 6.

5,595,798

PROTECTIVE HOLDERS FOR DISKS

CROSS REFERENCE TO RELATED APPLICATIONS

This application is a continuation-in-part of U.S. patent application Ser. No. 08/145,253, filed Oct. 29, 1993, now allowed, and of U.S. patent application Ser. No. 29/014,817, filed Oct. 29, 1993, now U.S. Pat. No. D353,837, which applications are incorporated herein by reference.

BACKGROUND OF THE INVENTION

This invention relates to devices for protectively storing disks, and more particularly to plastic wallets for containing disks such as optical digitally encoded disks.

As related in the aforementioned parent application Ser. No. 08/145,213, disk inserts have been utilized in cap closures for milk bottles, as well as for other containers for holding liquids such as fruit juices. Such disks are generally constructed of a rigid sheet material such as cardboard, are usually decorated or have a message printed thereon, and have become the subject of collection by many persons. In fact, interest in collecting such disks has increased in recent years to the extent that new disks are being designed for distribution directly to collectors. Regardless of their original purpose, these cardboard disks are commonly known as "milk caps", and are sometimes called "pogs" (which is an acronym for the names of certain fruits sold as juices). The dimensions of such collectible milk caps or pogs are generally substantially identical, regardless of their source, commonly having a diameter of approximately 1⅝ inches and a thickness of approximately 3/64 inch.

As with any collectible item, the physical condition of milk caps contribute significantly to their desirability and economic value. The proliferation of milk cap collections has resulted in a need for preserving the milk caps' original condition (or at least to decrease their further deterioration), while permitting their storage in an orderly fashion while also permitting the protected milk caps to be conveniently accessible and their printed surfaces to be viewed. The utilization of prior art devices, such as those designed for holding coins, have been unsuccessful in filling this need.

Other disks, such as those having digitally encoded information embedded thereon, also require protective devices for their storage and handling. One type of such disk is the well-known plastic disk having optical digitally encoded information thereon which, in a popular form commonly known as a "compact disc" or "CD", contains digitally encoded audio information thereon for playback by optical transducer means utilizing a laser device. CDs are conventionally individually packaged in a reusable storage device for protecting the CD and its optical information surface.

SUMMARY OF THE INVENTION

The invention disclosed in parent application Ser. No. 08/145,253 provides a device for protectively storing disks, and in particular collectible milk caps or pogs while permitting viewability of such disks, and of course may be utilized for protectively storing disks containing encoded information for playback such as compact discs or CDs. Briefly described, the device comprises, in combination, two flexible plastic panels in superposed relation, and securing means securing the panels in such superposed relation with a first opening for receiving the disk between the panels, the securing means including an arcuate seam sealing the superposed panels along a circular arc for containing at least one-half but not the entirety of the disk between the panels within the arc of the seam, the arc of the seam exceeding 180° (and preferably at least approximately 230°) and terminating at a second opening between the superposed panels of sufficient width for permitting passage therethrough and into the arc of at least one-half of the disk when the disk is received by the first opening. The width of the second opening and the inside diameter of the arcuate seam are related to the diameter and the thickness of the disk such that the disk resists withdrawal from within the arc of the seam through the second opening when at least one-half of the disk is contained within the arc.

A preferred embodiment of the device as disclosed in the aforementioned parent application is in the form of an album leaf for containing a plurality of disks, such as milk caps, the album leaf comprising, in combination, a first substantially rectangular flexible plastic panel; a plurality of substantially rectangular second flexible plastic panels; and securing means securing the second panels respectively to the first panel in superposed relation with an edge of each second panel providing a first opening between the first panel and the second panel for receiving the disks, the securing means including a plurality of arcuate seams sealing the second panels to the first panel in such superposed relation, each arcuate seam describing a circular arc for containing at least one-half but not the entirety of a one of the disks between the first panel and a one of the superposed second panels within the arc of the seam, the arc of the seam exceeding 180° (preferably being approximately 230°) and terminating at a second opening between the first panel and the one superposed second panel, the second opening having a width for permitting passage therethrough and into the arc of at least one-half of the one disk when the one disk is received by the first opening between the first panel and the one superposed second panel for containing the entirety of the one disk between the first panel and the one superposed panel. With respect to each of the arcuate seams, the width of the second opening and the inside diameter of the arcuate seam are related to the diameter and thickness of the one disk such that the one disk resists withdrawal from within the arc of the seam through the second opening when at least one-half of the disk is contained within the arc.

When a disk is fully inserted into the device through the first and a second opening, the disk is self-positioning with respect to the arcuate seam and, although only partially contained within the arcuate seam, is preferably completely contained between the two plastic panels. Although the device permits the disk to be easily withdrawn from between the two plastic panels by hand, the device causes resistance to accidental withdrawal of the disk from between the two panels.

A preferred embodiment of the device embraced in the present application is in the form of a wallet or holder for containing a disk, and in particular an information disk such as an optical compact disc or CD. A preferred embodiment of the wallet comprises a substantially rectangular first flexible plastic sheet foldable to form a front cover and a rear cover separated by a spine; a second flexible plastic sheet in superposed relation with the front cover and welded to the front cover along three edges thereof forming a pocket between the front cover and the second sheet having an opening; and a third flexible plastic sheet and a fourth flexible plastic sheet in superposed relation with one another and with the rear cover and welded to the rear cover along three edges thereof forming a second pocket between the rear cover and the third sheet having an opening, the third and fourth sheets further welded together by an arcuate seam along a circular arc including welds at the termini of the arc exceeding 180° forming a third pocket between the third and fourth sheets having a first opening for receiving the disk, the welds at the termini of the arc defining a second opening of the third pocket for permitting passage therethrough and into the arc of at least one-half but not the entirety of the disk when the disk is received by the first opening. The third sheet preferably includes a fabric surface, such as a non-woven fabric or spun plastic surface, facing the superposed fourth sheet.

The width of the second opening and the diameter of the arc are related to the diameter and thickness of the disk such that the disk resists withdrawal from within the arc through the second opening when at least one-half of the disk is contained within the arc.

For greater protection of the disk, the dimensions of the third and fourth sheets in relation to the disk are such that the disk is substantially entirely contained between the third and fourth sheets when at least one-half of the disk is contained within the arc. The typical CD includes a central aperture and the wallet may include, particularly in embodiments wherein the disk may be substantially entirely contained between the third and fourth sheets, an opening or slot in the fourth sheet for affording manual access to the disk's central aperture for assisting in withdrawal of the disk through the second and first pocket openings of the third pocket. A preferred feature of a CD wallet in accordance with the present invention is the provision of a slot in the fourth sheet longitudinally extending toward the wallet's spine and affording access to the central aperture in the CD when the CD is contained within the third pocket, or when at least one half of the CD is contained within the arc of the third pocket. The slot permits a person to manually urge the CD at the central aperture for displacing a portion of the CD from the third pocket, the slot being sufficiently long for thereupon affording access through the slot to an edge of the CD for displacing the CD's central aperture from the third pocket.

According to another aspect of the present invention, a wallet is provided for containing a compact disc, comprising a transparent substantially rectangular first flexible plastic sheet, foldable to form a front cover and a rear cover separated by a spine; a substantially rectangular second flexible plastic sheet in superposed relation with the front cover and welded to the front cover along three edges thereof, forming a first pocket between the front cover and the second sheet having an opening facing the spine; a substantially rectangular third flexible plastic sheet and a fourth flexible plastic sheet in superposed relation with one another and with the rear cover and welded to the rear cover along three edges thereof, forming a second pocket between the rear cover and the third sheet having an opening facing the spine, and forming a third pocket between the third and fourth sheets having an opening for receiving the compact disc; and a substantially rectangular graphics sheet contained in the first and second pockets and bridging the spine, the graphics on the graphics sheet being viewable through the first plastic sheet. The third and fourth sheets may be further welded together by an arcuate seam along a circular arc for containing at least one-half of the compact disc when the compact disc is received by the third pocket.

BRIEF DESCRIPTION OF THE DRAWINGS

The novel features which are believed to be characteristic of the invention, together with further advantages thereof, will be better understood from the following description considered in connection with the accompanying drawings in which preferred embodiments are illustrated by way of example. It is to be expressly understood, however, that the drawings are for the purpose of illustration and description only and are not intended as a definition of the limits of the invention.

FIG. 4 is an elevation view of the inside of a preferred embodiment of a wallet for holding a disk, shown in open condition and with a compact disc or CD contained therein;

FIG. 5 is a cross-sectional elevation view of the wallet of FIG. 4, taken along the line 5—5 of FIG. 4 in the direction of the appended arrows;

FIG. 6 is an enlargement of a fragment of the wallet of FIG. 4, the fragment indicated in FIG. 4 as within the dashed enclosure 6;

DESCRIPTION OF THE PREFERRED EMBODIMENTS

Figure 1:
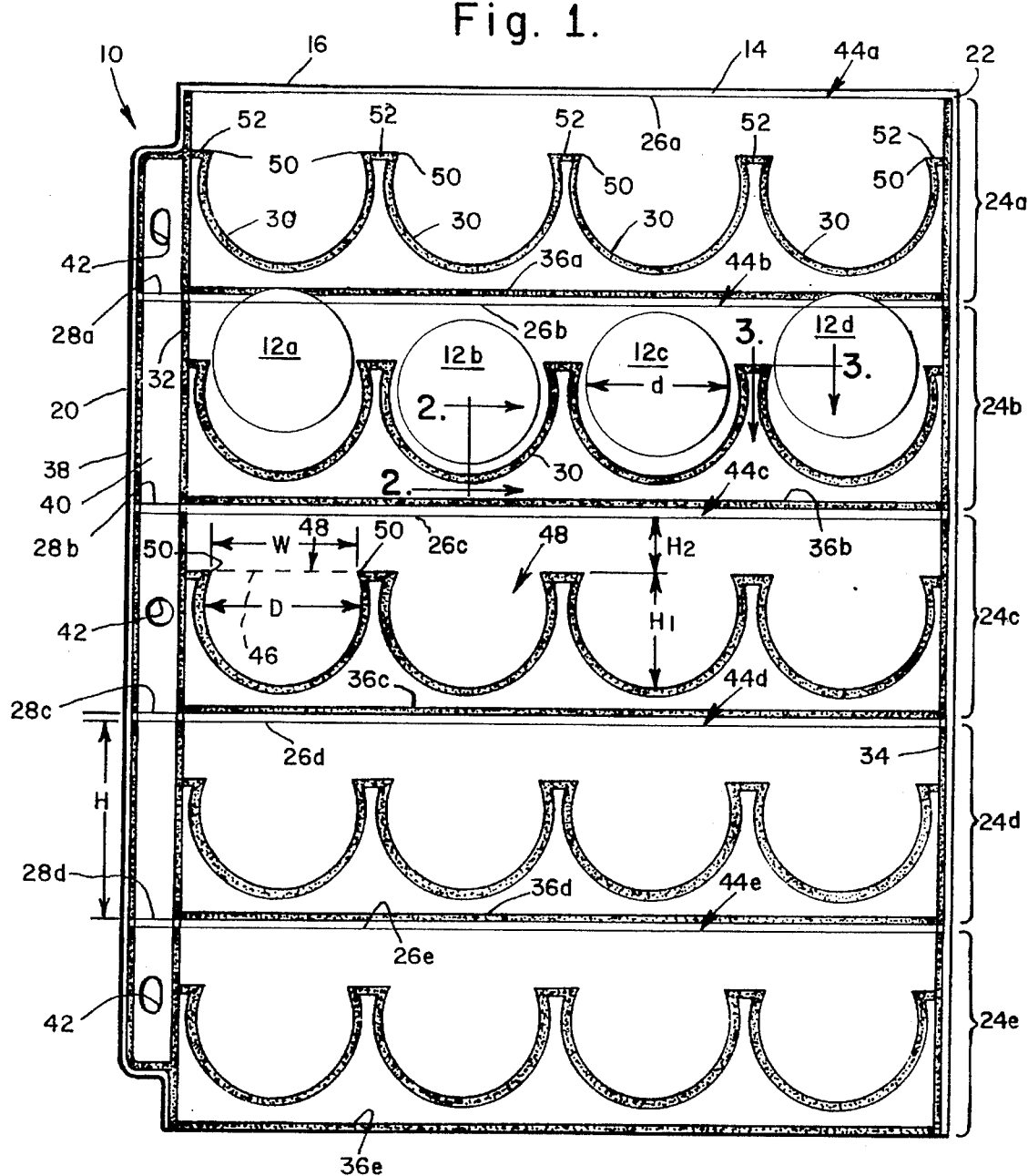
FIG. 1 is a front elevation view of a preferred embodiment of an album leaf, as taught in parent application Ser. No. 08/145,253, shown with a plurality of milk caps for illustrating the manner of use of such album page.
Figure 2:
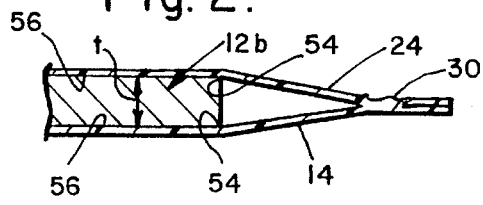
FIG. 2 is a fragmentary cross-sectional view of an arcuate seam of the album leaf of FIG. 1, with a contained milk cap, taken along the line 2—2 of FIG. 1 in the direction of the appended arrows.
Figure 3:
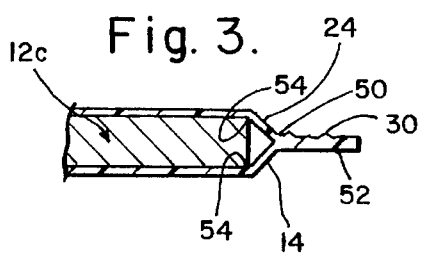
FIG. 3 is a fragmentary cross-sectional view of the album leaf of FIG. 1, at the opening to the arcuate seam during insertion or withdrawal of a milk cap, taken along the line 3—3 of FIG. 1 in the direction of the appended arrows.

Considering FIGS. 1, 2 and 3 together, there is illustrated a preferred embodiment of an album leaf 10 for protectively storing and displaying a plurality of disks 12 and in particular a plurality of milk caps 12, represented by the four disks or milk caps 12a, 12b, 12c, 12d, each having a diameter d and a thickness t. The album leaf 10 includes a substantially rectangular, flexible plastic sheet or panel 14 having an upper edge 16, a lower edge 18, a left edge 20 and a right edge 22, as viewed in FIG. 1. Superposed on the first sheet 14 are five strips 24 or second substantially rectangular, flexible plastic sheets or panels 24a, 24b, 24c, 24d, 24e, each having a height H slightly less than one-fifth the height of the first panel 14, and each having a width substantially equal to the width of the first panel 14. Each of the second panels 24 is directly superposed on the first panel 14, and the second panels 24 are arranged such that their respective left edges are aligned with the left edge 20 of the first panel 14 and their respective right edges are aligned with the right edge 22 of the first panel 14. As viewed in FIG. 1, the uppermost second panel 24a is superposed on the first panel 14 with the upper edge 26a of the second panel 14a parallel to and slightly lower than the upper edge 16 of the first panel 14; the upper edge 26b of the second panel 24b is parallel to and slightly lower than the lower edge of the uppermost second panel 24a; the upper edge 26c of the second panel 24c is parallel to and slightly lower than the lower edge 28b of the second panel 24b; the upper edge 26d of the second panel 24d is parallel to and slightly lower than the lower edge 28c of the second panel 24c; and the upper edge 26e of the lowermost second panel 24e is parallel to and slightly lower than the lower edge 28e of the lowermost second panel 24e being aligned with the lower edge 18 of the first panel 14.

The second panels 24 are each secured to the first panel 14 in superposed relation, arranged as described above, by means at least of a plurality of arcuate seams 30. Preferably, the panels 14, 24 are further secured together in such relation by a seam pattern which includes, as viewed in FIG. 1, a left vertical seam 32 and a right vertical seam 34 extending from the leaf's upper edge 16 to its lower edge 18, horizontal seams 36a, 36b, 36c, 36d, 36e, extending between the vertical seams 32, 34 and along the lower edges 28a, 28b, 28c, 28d, 28e of the respective second panels 24a, 24b, 24c, 24d, 24e. A seam 38 is preferably provided along the leaf's left edge 20, for providing a tab or margin 40 in which apertures 42 may be cut for permitting the leaf 10 to be retained by correspondingly positioned rings of a loose-leaf binder or album.

The first and second panels 14, 24 are preferably of a thermoplastic sheet material, i.e. a plastic sheet material which is susceptible to thermo-adhesive welding techniques for securing the superposed panels 14, 24 by means of the seams 30, 32, 34, 36, 38 having been formed by thermo-contact or radio-frequency welding techniques. One example of such thermoplastic sheet material is polyvinyl chloride, or vinyl, whereby the seams sealing the panels together may be produced by well known radio-frequency welding techniques. A preferred example of a thermoplastic sheet material is a polyolefin such as polypropylene, which material is substantially chemically inert so as not to react with dyes and other surface components of milk caps, and is physically resistant to extreme heat and cold. Utilizing polypropylene sheet material for the first and second panels 14 and 24, the seams 30, 32, 34, 36, 38 may be produced by thermocontact welding techniques such as taught by U.S. Pat. No. 5,312,507 of William R. Miller, titled "Thermocontact Welding Method and Welded Product", which patent is incorporated herein by this reference. In one suitable example of the album leaf 10, the thickness of each of the polypropylene panels 14, 24a, 24b, 24c, 24d, 24e was approximately 120 microns, although flexible sheets of other thermoplastic materials and/or having other thicknesses may be employed. Further, it is preferred that either the first panel 14 or the second panels 24 be transparent, or alternatively that both the first panel 14 and the second panels 24 be transparent, so that at least one surface of each of the milk caps 12 may be viewed when contained between the panels 14, 24 of the album leaf 10.

The second panels 24a, 24b, 24c, 24d, 24e are secured to the first panel 14 such that the respective upper edges 26a, 26b, 26c, 26d, 26e of the second panels 24 between the vertical seams 32, 34 are unsealed, providing respective openings 44a, 44b, 44c, 44d, 44e between the first panel 14 and the respective second panels 24 for receiving the disks 12 between the first panel 14 and a second panel 24, for example as illustrated by the disk 12a shown in FIG. 1.

The arcuate seams 30 sealing a second panel 24 to the first panel 14 are horizontally arranged along the second panel 24. Each arcuate seam 30 describes a circular arc for containing at least one-half (preferably more than one-half) but not the entirety of a disk 12 between the superposed panels 14, 24, within the arc of the arcuate seam 30. The arc of each of the arcuate seams 30 exceeds 180° and terminates at a horizontal chord 46 (shown in phantom in FIG. 1), i.e. the chord 46 being substantially parallel to the second panel's upper edge 26. The termination of the arcuate seam 30 (i.e. at the chord 46) provides each arcuate seam 30 with a second opening 48 between the superposed panels 14, 24 of sufficient width W (i.e. between the arcuate seam's termini 50) for permitting passage through the second opening 48 and into the arc of a seam 30 of at least one-half (and preferably more than one-half) of a disk 12 when the disk 12 is received by the first opening 26, for example as illustrated by the disks 12a and 12b in FIG. 1. The height H of each of the second panels 24 is sufficiently great that the entirety of the disk 12 is contained between the superposed panels 14, 24 when the disk 12 is normally situated within the arc of the seam 30, as illustrated by the disks 12b and 12c of FIG. 1.

The arcuate seams 30 preferably terminate with reinforcing welds such as the horizontal seams 52 which, if situated between adjacent arcuate seams 30, may connect adjacent termini 50 thereof.

The inside diameter D of each arcuate seam 30 is slightly greater than the diameter d of a disk or milk cap 12. When a milk cap 12 has been inserted into an arcuate seam 30 between the first panel 14 and a second panel 24 and then released by the person inserting the milk cap, the milk cap 12 is automatically positioned concentrically within the arcuate seam 30, as illustrated by the milk cap 12b in FIG. 1. Such self-positioning of the milk cap 12 appears to be in reaction to forces exerted by the somewhat elastic first and second panels 14, 24, upon the circumferential intersections 54 of the milk cap's respective sides 56 with its edge 58 as the two panels 14, 24 inwardly of the arcuate seam 30 are forced apart in consequence of the thickness t of the inserted disk 12, as illustrated in FIG. 2.

The width W of each arcuate seam opening 48 (i.e., the length of the chord 46) and the inside diameter D of an arcuate seam 30 are related to the diameter d and thickness t of a disk or milk cap 12 such that the milk cap 12 resists withdrawal from within the arcuate seam 30 through the second opening 48 when at least one-half of the milk cap 12 is contained within the arc of the seam 30. For examples of the preferred embodiment of the album leaf 10 described herein, it has been observed that a milk cap 12 which has been received by an arcuate seam 30 (see milk cap 12b of FIG. 1) resists withdrawal from within the arc even when the leaf 10 is turned upside-down and vigorously shaken, in which event the milk cap 12 became situated within the arcuate seam 30 as represented by the milk cap 12c of FIG. 1, reining entirely contained between the first and second panels 14, 24.

When a milk cap 12 is to be intentionally removed from between the panels 14, 24 of the leaf 10, such as when a milk cap 12 is grasped by a person's fingers and outwardly urged (upwardly as viewed in FIG. 1) for being withdrawn as represented by the milk cap 12d of FIG. 1, the milk cap's position of greatest resistance to withdrawal is when its diameter d is aligned with the chord 46 for passage through the second opening 48. This condition is represented in greater detail in FIG. 3, wherein it may be appreciated that the magnitude of the forces exerted upon the circumferential intersections 54 of the milk cap's respective sides 56 with its edge 58—in consequence of the thickness t of the milk cap 12c and the elasticity of the panels 14, 24 inwardly of the arcuate seam's termini 50—is at a maximum. The magnitude of such drag forces when the disk is in its normal position within the arcuate seam 30 and entirely between the first and second panels 14, 24, as represented by milk caps 12b and 12c in FIG. 1, is of course less than the maximum forces exerted during intentional withdrawal. Nevertheless, the dimensions of the width W of the second opening 48 and the inside diameter D of the arcuate seam 30 in relation to the diameter d and thickness t of the milk cap 12, present forces which are sufficient for normally maintaining the milk cap 12 entirely contained between the first panel 14 and a second panel 24, and for causing the milk cap 12 to resist withdrawal through the second opening 48, when at least one-half of the milk cap is contained within the arc of the arcuate seam 30.

It is thought that other forces resulting from the relationships discussed above may be involved in causing the disk to resist withdrawal from within the arcuate seam 30, such as drag forces provided by surface contact between the panels 14, 24, and the two sides 56 of the milk cap 12, and perhaps by a tendency for air pressure within the arc of the arcuate seam 30 to decrease, as the milk cap 12 is outwardly urged from its normal position within the arc of the seam 30.

In one suitable example of an album leaf 10 fabricated of transparent 120 micron polypropylene panels 14, 24 for containing milk caps 12 of 1⅝ inch diameter d and ³⁄₆₄ inch thickness t, each second panel 24 had a width between vertical seams 32, 34 of approximately 8¼ inches and a height H of approximately 2⅛ inches, and the second panels 24 were superposed on the first panel 14 with a vertical separation between respective edges 28, 26 of vertically adjacent second panels 24 of approximately ⅛ inch. The 2⅛ inch height H of a second panel 24 allowed for a vertical or perpendicular distance of approximately ⅝ inch between the chord 46 and the second panel's upper edge 26, although it was observed for this album leaf example that this perpendicular distance could be reduced to approximately ½ inch with satisfactory results. The arc of each arcuate seam 30 was approximately 230°, the inside diameter D of the arc of each arcuate seam 30 was approximately 1¹³⁄₁₆ inches, and the width W of the second opening 48 or chord 46 (between the termini 50 of an arcuate seam 30) was approximately 1¹¹⁄₁₆ inches.

It may be observed for this example of the preferred album page 10, that the width W of the second opening 48 was greater than the diameter d of a milk cap 12 by a distance of approximately ⅔ times the thickness t of the milk cap 12, although it would appear that satisfactory results would be achieved for widths W of the second opening 48 greater than the diameter d of a milk cap 12 and through a range exceeding ⅔ the thickness t. It may be similarly observed that the difference between the inside diameter D of the arc of an arcuate seam 30 and the diameter d of a milk cap 12 was approximately four times the thickness t of the milk cap 12.

Turning to FIGS. 4, 5 and 6, there is shown a preferred embodiment of a wallet 60 for protectively storing a disk such as an optical digitally encoded compact disc or CD 62 (shown in phantom). The CD wallet 60 includes a substantially rectangular first flexible plastic panel or sheet 64 having an upper edge 66, a lower edge 68, a left edge 70 and a right edge 72, as viewed in the drawing of FIG. 4. The rectangular first sheet 64 is preferably of a thermoplastic sheet material, preferably a polyolefin such as polypropylene, and is foldable along two parallel fold lines or creases which may be implemented by respective bar seals 74, 76 produced by an appropriate thermoplastic welding process. The bar seals 74, 76 are parallel to the upper and lower edges 66, 68 of the rectangular first sheet 64 and are situated along the sheet 64 to form a spine 78 therebetween and midway between the upper and lower edges 66, 68. When the rectangular first sheet 64 is folded along the bar seals 74, 76, the first sheet 64 comprises a front cover 80 and a rear cover 82 separated by the spine 78.

A second flexible plastic panel or sheet 84, preferably rectangular and substantially of the same dimensions as the front cover 80, is in superposed relation with the front cover 80, and is welded along three of its edges to the inner surface of the front cover 80 by means of welded edge seams 86. The fourth edge 88 of the second sheet 84 remains unsealed, resulting in a first pocket 90 between the front cover 80 and the second sheet 84 having an opening 92 preferably adjacent and parallel to or otherwise facing the spine 78.

A third flexible plastic panel or sheet 94 is in superposed relation with a fourth flexible plastic panel or sheet 96. The third and fourth sheets 94, 96 are preferably substantially rectangular and are of substantially the same width (i.e. the horizontal dimension as viewed in the drawing of FIG. 4) as the width of the rear cover 82 and slightly wider than the diameter of the disk 62. The third sheet 94 is preferably of a thermoplastic laminate material having a spun or nonwoven fabric surface, such as a one ounce spun or nonwoven polypropylene fabric laminated to a 60 micron polypropylene backing sheet. The fourth sheet 96 is of a thermoplastic sheet material, preferably a polyolefin such as polypropylene.

The superposed third and fourth sheets 94, 96, with the spun or fabric surface of the third sheet 94 facing the fourth sheet 96, are welded together by an arcuate seam 98 along a circular arc 100. The circular arc 100 exceeds 180° and terminates at termini 102 at each end of a horizontal chord 104 (as viewed in the drawing of FIG. 4 and shown in phantom therein). As with the configuration of the arcuate seam 30 discussed above in connection with FIG. 1, the weld of the arcuate seam 98 in FIG. 4 may continue along the circular arc 100 until reaching the arc's termini 102 so that the welds at the termini 102 of the arc 100 represent the termini of an arcuate seam which is continuous throughout the circular arc 100. It is preferred, however, that when welding together the third and fourth sheets 94, 96, there is a break or discontinuity in the arcuate seam 98 as the arc 100 approaches parallelism with a vertical edge 106 of the superposed third and fourth sheets 94, 96. In this case the welds at the termini 102 of the circular arc 100 may be spot welds 108, the inner boundaries of which are along the circular arc 100 at the termini 102.

Figure 7:
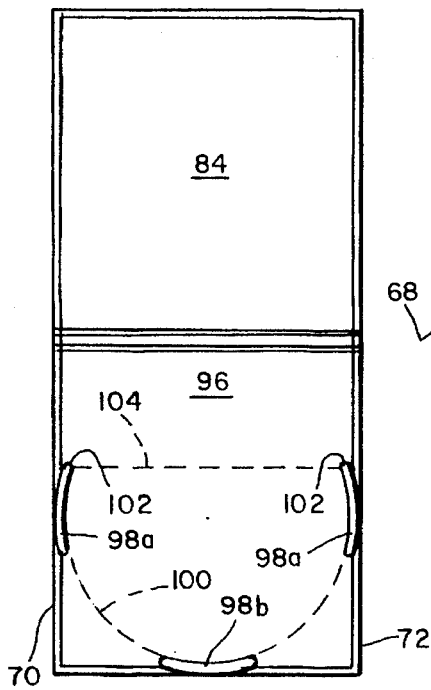
FIG. 7 is an elevation view of the inside of an alternative embodiment of a wallet for holding a disk or CD.

The weld of the arcuate seam 98 may be discontinuous at other places along the circular arc 100. For example, as shown in FIG. 7, the arcuate seam 98 may include two end segments 98a terminating at the respective termini 102 of the circular arc 100, and may also include a third seam segment 98b centrally positioned between the wallet's left and right edges 70, 72 (as viewed in the drawing of FIG. 7) and along the circular arc 100. The welds at the termini 102 of the circular arc 100 are represented by the uppermost (as viewed in the drawing of FIG. 7) ends of the seams 98a, respectively, at each end of the chord 104.

Returning to FIGS. 4–6, the superposed third and fourth sheets 94, 96, which have been welded together along the circular arc 100 as just described, are further welded to the inner surface of the rear cover 82 along three edges thereof by means of the welded edge seams 86. A fourth edge 110 of the third sheet 94 remains unsealed and is preferably adjacent and parallel to the spine 78, defining a pocket opening 112 of a second pocket 114 formed between the rear cover 82 and the third sheet 94 by the welded edge seams 86. The arcuate seam 98 between the third and fourth sheets 94, 96, as continued by the two vertical welded edge seams 86 upwardly thereof (i.e. upwardly from the ends 116 of the previously formed arcuate seam 98) defines a third pocket 120 having a first opening 122 along the unsealed fourth edges 110, 124 of the third and fourth sheets 94, 96.

The welds 108 at the termini 102 of the circular arc 100 along which the arcuate seam 98 extends, defines a second opening 126 between the superposed third and fourth sheets 94, 96 of sufficient width (as represented by the chord 104) for permitting passage through the second opening 126 and into the arc 100 of at least one-half (and preferably more than one-half) of the disk 62 when the disk 62 is received by the first opening 122. When the CD 62 is inserted in the pocket 120 (as shown in FIGS. 4 and 5), the CD 62 is oriented such that its optical digitally encoded surface faces the third sheet 94, while the CD's other side (which is typically imprinted with identifying and decorative indicia) faces the fourth sheet 96 which is preferably transparent for viewing the CD's printed surface. The height (i.e. the vertical dimension as viewed in the drawing of FIGS. 4 and 5) of the third sheet 94 is preferably sufficiently great for assuring that at least the digitally encoded surface of the CD 62 engages the spun or non-woven surface of the third sheet 94 when the CD 62 is contained within the pocket 120. For greater protection of the CD 62, it is preferred that the height of the fourth sheet 96 is sufficiently great that substantially the entirety of the disk is contained between the third and fourth superposed sheets 94, 96 when at least one-half of the CD 62 is received by the second opening 126.

The diameter of the circular arc 100, and accordingly the inside diameter of the arcuate seam 98, is slightly greater than the diameter of the disk 62. It may be appreciated that the manner in which the disk 62 may be inserted and withdrawn from the pocket 120, and the characteristics and relationships thereof, are as previously disclosed herein in FIGS. 1–3 and the corresponding discussion in connection with the album page 10. The width of the second opening 126 of the pocket 120 and the inside diameter of the arcuate seam 98 are related to the diameter and thickness of the disk 62 such that the disk resists withdrawal from within the seam 98 through the second opening 126 when at least one-half of the disk 62 is received by the second opening 126 for being contained within the arc 100. The width of the second opening 126 is greater than the diameter of the disk 62 by a distance for increasing drag force on the disk 62 when the disk 62 is outwardly urged from the CD pocket 120 (i.e. upwardly urged as viewed in the drawing of FIGS. 4 and 5) while at least one-half of the disk is contained within the arc 100.

A typical audio CD includes a central aperture 128, and an opening 130 may be provided in the fourth sheet 96 of the CD wallet 60 to afford access by a person through the fourth sheet 96 to the CD 62 at its central aperture 128 when the CD 62 is contained in the pocket 120. The opening 130 illustrated in FIGS. 4 and 5 is in the configuration of a slot 130 exposing a portion of the CD 62 in the vicinity of its aperture 128 and longitudinally extending toward the wallet's spine 78 and the first opening 122 of the pocket 120. The width of the slot 130 is at least as great as the diameter of the CD aperture 128. When it is desired to withdraw the CD 62 from the pocket 120, a person may reach through the slot 130 with his or her finger or thumb and engage the CD 62 at an annular edge 129 or circumference of the aperture 128. In this manner, the CD 62 may be urged outwardly (i.e. upwardly as viewed in the drawing of FIGS. 4 and 5) for displacing a substantial portion of the CD 62 (e.g. the upper approximately 1⅞ inches to 2 inches along the CD's vertical diameter, or approximately the upper 40% of such vertical diameter, as viewed in the drawing of FIG. 8) through the CD pocket's first opening 122, and for displacing the CD's horizontal diameter through the pocket's second opening 126. This condition is illustrated in FIG. 8, and the slot's upper edge 138 (as viewed in the drawing of FIGS. 4 and 8) is in sufficient proximity to the pocket opening 122 (e.g. approximately ⅛ inch to ¼ inch) such that the CD portion extending from the CD pocket opening 122 is sufficiently great to permit ready entry of the CD 62 (directly from the wallet 60) into a typical front-loading CD player when the wallet's front cover 80 is reversely folded at the spine 78.

Figure 8:
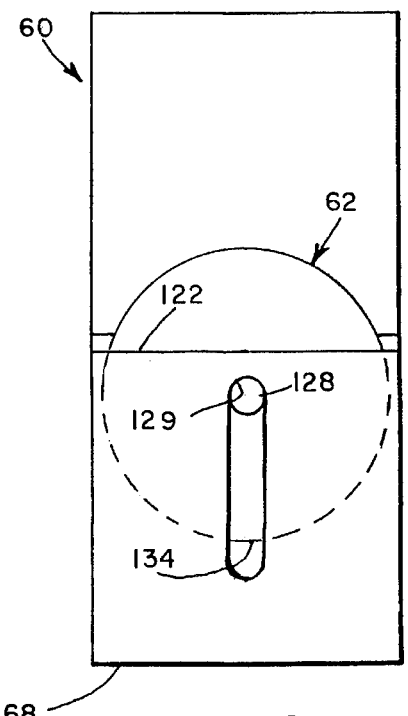
FIGS. 8 and 9 are elevation views of the inside of the preferred wallet embodiment as in FIG. 4, shown with the CD during removal from the wallet.
Figure 9:
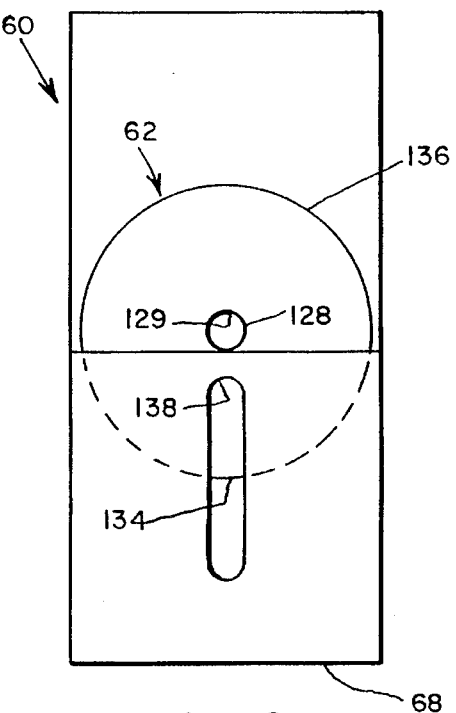

Although the lower edge 139 slot 130 need barely expose the CD's central aperture 128, in the configuration shown in FIGS. 4 and 5 the slot 130 longitudinally (perpendicularly to the spine seals 74, 76) extends both above and below the CD aperture 128 sufficiently to permit a person to urge the annular edge 129 of the CD 62 for displacing a substantial portion of the CD 62 through the first opening 122 of the CD pocket 120, to the extent that a circumferential edge portion 134 of the CD 62 facing the wallet's lower edge 68 is exposed through the slot 130 as shown in FIG. 8. The person may thereupon reach through the slot 130 and urge the exposed circumferential edge portion 134 outwardly (i.e. upwardly as viewed in the drawing of FIG. 8) for further displacing the CD 62 through the first opening 122 until at least a portion of the CD aperture 128 is outside the CD pocket 120, as illustrated in FIG. 9. Such further displacement of the CD 62 from the pocket 120 not only permits ready entry of the CD 62 (directly from the wallet 60) into a typical front-loading CD player, but alternatively permits the person to grasp the CD 62 at its aperture 128 (i.e. at the annular edge 129) and the CD's circumferential or outer edge 136 for completely removing the CD 62 from its pocket 120. It is noted that the slot's upper edge 138 acts as a stop for the persons finger to stop the outward displacement of the CD 62 from the pocket 120 until the CD 62 is further displaced by the person's outward urging of the CD lower circumferential edge portion 134.

Figure 10:
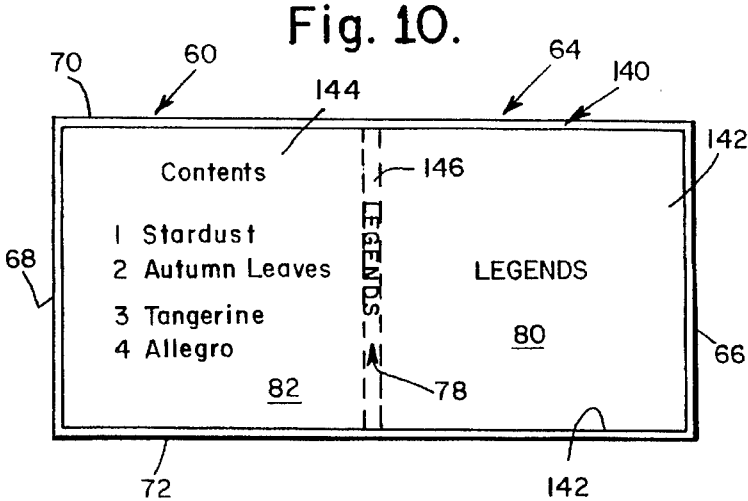
FIG. 10 is an elevation view of the outside of the wallet of FIG. 4, shown in open condition and with a graphics sheet contained therein.

The first pocket 90 between the front cover 80 and the second sheet 84, as well as the second pocket 114 between the rear cover 82 and the third sheet 94, may be utilized to contain documents having decorative and program graphics thereon relating to the information embedded in the particular CD 62 to be carried by the wallet 60. The positions of the pocket openings 92, 112 on opposite sides of the wallet spine 78 permit such graphics to be designed as a single sheet, if desired, for being contained in both pockets 90, 114 and extending between the wallet's upper and lower edges 66, 68 and folded along the spine 78. This feature of the wallet 60 is illustrated in FIG. 10, it being understood that the wallet 60 as shown in FIG. 10 is turned 90° from its orientation as shown in FIG. 4, in the plane of the drawing; in FIG. 10, the outside surface of the wallet 60 is shown with the single rectangular sheet of graphics 140 viewable through the transparent first plastic sheet 64 with the front cover 80 and rear cover 82 on either side of the vertically shown spine 78. The graphics sheet 140 may include a title section 142 (having graphics thereon identifying the title or audio program of the CD) contained in the first pocket 90 with its graphics viewable through the transparent front cover 80; a contents section 144 (having graphics thereon for identifying the contents of or each selection included in the CD program) contained in the second pocket 114 with its graphics viewable through the transparent rear cover 82; and a spine section 146 between the title and contents sections 142, 144 (typically having title graphics thereon and folded for corresponding with the bar seals 74, 76 of the first plastic sheet 64 and bridging the spine 78) with its graphics viewable through the wallet's transparent spine 78. The graphics sheet 140 may be inserted in the pockets 90, 114 through their pocket openings 92, 112. Alternatively, the graphics sheet 140 may be contained in the pockets 90, 114 as a result of another operation such as by superposing the graphics sheet 140 on the first plastic sheet 64 during the seam welding operation so that the graphics sheet 140 is contained in the pockets 90, 114 as such pockets are being formed. When the wallet 60 is closed by pivoting the front and rear covers 80, 82 from the spine 78, the second and fourth plastic sheets 84, 96 face each other while the graphics on the graphics sheet 140 are viewable from the outside of the closed wallet 60. Further program materials, for example in the form of a booklet (not shown), may be inserted in either of the two pockets 90, 114; if such further program materials were inserted in the first or front cover pocket 90, between the reverse side of the title section 142 of the graphics sheet 140 and the second plastic sheet 84, the second sheet 84 preferably would be transparent so that the graphics on an outer leaf of such further materials may be viewed therethrough when the wallet 60 is in its open condition.

In one suitable example of a CD wallet 60 fabricated of transparent 250 micron polypropylene first, second and fourth sheets 64, 84, 96, and a third sheet 94 of one-ounce spun polypropylene laminated to a 60 micron polypropylene backing, for containing a CD 62 of nominally 120 millimeter diameter (approximately 4.724 inches) and 0.050 inch thickness, and having a central aperture 128 of nominally 5/8 inch diameter, the wallet's front and rear covers 80, 82 were each approximately 5 inches square with a spine 78 of approximately 1/8 inch wide. The width of the welded seams 86, 98 was approximately 3/64 inch, and each terminal spot weld 108 was approximately 1/32 inch in width with the midpoint of its approximately 1/8 inch height situated approximately 7/16 above the horizontal diameter 132 of the arc 100. The height and width of each of the three pockets 90, 114, 120 were approximately 4 27/32 inches. The circular arc 100 (to the vertical mid-point of the inside boundary of each spot weld 108) was approximately 200°, the inside diameter of the arcuate seam 98 (i.e. the diameter of the circular arc 100) was approximately 4.844 inches, the width of the CD pocket second opening 126 (or chord 104) was approximately 4 25/32 inches (approximately 4.781 inches), and the width of the CD pocket first opening 122 was approximately 4 27/32 inches (approximately 4.844 inches). Where a slot opening 130 is included through the fourth sheet 96 in accordance with the configuration shown in FIG. 4, such slot 130 may be approximately 3/4 inch in width by approximately 2 1/2 to 3 inches in length, with the slot's upper edge 138 approximately 1/4 inch distant from the unsealed edge 124 of the fourth sheet 96.

Thus there has been described a device for protectively storing a disk, and in particular a wallet for storing a CD. Other embodiments of the invention and other configurations of the embodiments' presented herein may be developed without departing from the essential characteristics thereof. Accordingly, the invention should be limited only by the scope of the claims listed below.

I claim:

1. A wallet for containing a disk, comprising:

a disk;

a substantially rectangular first flexible plastic sheet foldable to form a front cover and a rear cover separated by a spine;

a second flexible plastic sheet in superposed relation with said front cover and welded to said front cover along three edges thereof forming a first pocket between said front cover and said second sheet having an opening; and a third flexible plastic sheet and a fourth flexible plastic sheet in superposed relation with one another and with said rear cover and welded to said rear cover along three edges thereof forming a second pocket between said rear cover and said third sheet having an opening, said third and fourth sheets further welded together by an arcuate seam along a circular arc exceeding 180° including welds at the termini of said arc forming a third pocket between said third and fourth sheets having a first opening for receiving said disk, said welds at said termini defining a second opening of said third pocket for permitting passage therethrough and into said arc of at least one-half but not the entirety of said disk when said disk is received by said first opening, the width of said second opening of said third pocket and the diameter of said arc being related to the diameter and the thickness of said disk such that said disk resists withdrawal from within said arc through said second opening when at least one-half of said disk is contained within said arc.

2. The wallet according to claim 1, wherein:

the width of said second opening of said third pocket is greater than the diameter of said disk by a distance for increasing drag force on said disk by said superposed third and fourth sheets as said disk is outwardly urged while at least one-half of said disk is contained within said arc.

3. The wallet according to claim 1, wherein:

said arcuate seam is discontinuous along said arc.

4. The wallet according to claim 1, wherein:

said arc is at least approximately 200°.

5. The wallet according to claim 1, wherein:

said third sheet includes a fabric surface facing said superposed fourth sheet.

6. The wallet according to claim 1, wherein:

said fourth sheet includes an opening therein affording access to a central aperture in said disk when at least one-half of said disk is contained within said arc.

7. The wallet according to claim 1, wherein:

the dimensions of said third and fourth sheets in relation to said disk are such that the disk is substantially entirely contained between said third and fourth sheets when at least one-half of said disk is contained within said arc.

8. The wallet according to claim 7, wherein:

said fourth sheet includes an opening therein affording access to a central aperture in said disk when at least one-half of said disk is contained within said arc.

9. The wallet according to claim 8, wherein:

said opening in said fourth sheet comprises a slot longitudinally extending toward said spine and exposing said central aperture in said disk when at least one-half of the disk is contained within said arc.

10. The wallet according to claim 7, wherein:

said fourth sheet includes a slot therein longitudinally extending toward said spine and affording access to a central aperture in said disk when at least one-half of said disk is contained within said arc for displacing a substantial portion of said disk through said first opening of said third pocket.

11. The wallet according to claim 10, wherein:

said slot is sufficiently long for affording access through said slot to an edge of said disk, when said substantial portion of said disk is displaced though said first opening of said third pocket, for displacing at least a portion of said central aperture of said disk through said first opening of said third pocket.

12. The wallet according to claim 1, wherein:

said opening of said first pocket faces said spine, and said opening of said second pocket faces said spine.

13. The wallet according to claim 12, further including:

a substantially rectangular graphics sheet contained in said first and second pockets and bridging said spine, the graphics on said graphics sheet being viewable through said first plastic sheet.

14. A wallet for containing a disk having a central aperture, comprising:

a disk having a central aperture;

a substantially rectangular first flexible plastic sheet foldable to form a front cover and a rear cover separated by a spine;

a second flexible plastic sheet in superposed relation with said front cover and welded to said front cover along three edges thereof forming a first pocket between said front cover and said second sheet having an opening; and a third flexible plastic sheet and a fourth flexible plastic sheet in superposed relation with one another and with said rear cover and welded to said rear cover along three edges thereof forming a second pocket between said rear cover and said third sheet having an opening and forming a third pocket between said third and fourth sheets having an opening for receiving said disk, said fourth sheet including a slot therein longitudinally extending toward said spine and affording access to said central aperture in said disk when said disk is contained in said fourth pocket for displacing a portion of said disk through said opening of said fourth pocket, said slot being sufficiently long for thereupon affording access through said slot to an edge of said disk for displacing at least a portion of said central aperture of said disk through said opening of said fourth pocket.

15. The wallet according to claim 14, wherein:

said third and fourth sheets are further welded together by an arcuate seam along a circular arc for containing at least one-half of said disk when said disk is received by said opening of said third pocket.

16. A device for holding a compact disc, comprising:

a compact disc; and two flexible plastic sheets in superposed relation and welded together by seams including an arcuate seam along a circular arc exceeding 180° including welds at the termini of said arc forming a pocket between said sheets having a first opening for receiving said compact disc, said welds at said termini defining a second opening of said pocket for permitting passage therethrough and into said arc of at least one-half but not the entirety of said compact disc when said compact disc is received by said first opening, the width of said second opening and the diameter of said arc being related to the diameter and the thickness of said disc such that said disc resists withdrawal from within said arc through said second opening when at least one-half of the disc is contained within said arc.

17. The device according to claim 16, wherein:

the dimensions of said sheets in relation to said compact disc are such that said compact disc is substantially entirely contained between said sheets when at least one-half of said compact disc is contained within said arc.

18. The device according to claim 16, wherein:

one of said sheets includes an opening therein affording access to a central aperture in said compact disc when at least one-half of said compact disc is contained within said arc for outwardly displacing a diameter of said disc through said second opening of said pocket.

19. The device according to claim 16, wherein:

one of said sheets includes a slot therein longitudinally extending toward said first opening and affording access to a central aperture in said compact disc when at least one-half of said compact disc is contained within said arc for displacing a substantial portion of said disc through said first opening.

20. The device according to claim 19, wherein:

said slot is sufficiently long for affording access through said slot to a circumferential edge of said compact disc when said substantial portion of said disc is displaced through said first opening, for displacing at least a portion of said central aperture of said compact disc through said first opening.

21. A device for holding a compact disc having a central aperture, comprising:

a compact disc having a central aperture; and two flexible plastic sheets in superposed relation and welded together by a seam forming a pocket between said sheets having an opening for receiving said compact disc, one of said sheets including a slot therein longitudinally extending toward said opening and affording access to said central aperture in said disc when said disc is in said pocket for displacing a portion of said disc through said opening, said slot being sufficiently long for thereupon affording access through said slot to an edge of said disc for displacing at least a portion of said central aperture of said disc through said opening of said pocket.

22. A device for holding a compact disc, comprising the combination of:

a compact disc; and two flexible plastic sheets in superposed relation and welded together by seams forming a pocket between said sheets having a first opening for receiving said compact disc, and by two welds defining therebetween a second opening of said pocket for permitting passage through said second opening of at least one-half but not the entirety of said disc when said disc is received by said first opening, the width of said second opening being related to the diameter and thickness of said disc such that said disc resists withdrawal from within said pocket through said second opening when at least one-half of said disc is received by said second opening.

23. A device for holding a compact disc, comprising the combination of:

a compact disc; and two flexible plastic sheets in superposed relation and welded together by seams forming a pocket between said sheets having a first opening for receiving said compact disc, and by two welds defining therebetween a second opening of said pocket for permitting passage therethrough of at least one-half but not the entirety of said disc when said disc is received by said first opening, the width of said second opening being greater than the diameter of said disc by a distance for increasing drag force on said disc when said disc is outwardly urged from said pocket while at least one-half of said disc is received by said second opening.

* * * * *